United States Patent
Oleksiewicz

(10) Patent No.: US 8,207,633 B2
(45) Date of Patent: Jun. 26, 2012

(54) BATTERY BACK UP FOR ELECTRONIC MODULES

(75) Inventor: Radek Oleksiewicz, Riverwoods, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 201 days.

(21) Appl. No.: 12/817,265

(22) Filed: Jun. 17, 2010

(65) Prior Publication Data

US 2011/0309680 A1   Dec. 22, 2011

(51) Int. Cl.
*H02J 2/00* (2006.01)
*H02G 3/00* (2006.01)

(52) U.S. Cl. ............ 307/66; 307/9.1; 307/10.1; 307/64; 439/500; 439/504

(58) Field of Classification Search ............... 307/4, 9.1, 307/10.1, 23, 64, 66; 340/693.2; 180/68.5; 365/229; 320/107; 439/500, 504
See application file for complete search history.

(56) References Cited

U.S. PATENT DOCUMENTS

| | | | |
|---|---|---|---|
| 4,799,126 A | 1/1989 | Kruse | |
| 4,875,041 A | 10/1989 | Dannenberg | |
| 5,245,251 A | 9/1993 | Irick | |
| 5,365,436 A | 11/1994 | Schaller | |
| 5,402,008 A * | 3/1995 | St. John | 307/64 |
| 5,441,022 A | 8/1995 | Yoder | |
| 5,449,956 A | 9/1995 | Williams | |
| 5,563,547 A | 10/1996 | Blanchard | |
| 5,585,784 A | 12/1996 | Pabla | |
| 5,629,670 A | 5/1997 | Pabla | |
| 5,677,671 A | 10/1997 | Pabla | |
| 5,760,546 A | 6/1998 | Pabla | |
| 5,780,974 A | 7/1998 | Pabla | |
| 5,795,181 A * | 8/1998 | Davis | 439/500 |
| 6,016,045 A * | 1/2000 | Thomas et al. | 320/107 |
| 6,100,602 A | 8/2000 | Schlaudroff | |
| 6,272,402 B1 | 8/2001 | Kelwaski | |
| 6,297,566 B1 | 10/2001 | Lahr | |
| 6,329,724 B1 | 12/2001 | Shaklik | |
| 6,466,431 B1 | 10/2002 | Thomas | |
| 6,515,425 B1 | 2/2003 | Bender | |
| 6,522,029 B1 | 2/2003 | Bell | |
| 6,690,140 B2 | 2/2004 | Larson | |
| 6,724,102 B1 | 4/2004 | Kelwaski | |
| 6,738,701 B2 | 5/2004 | Wilson | |
| 7,638,232 B2 * | 12/2009 | Yamamoto | 429/100 |
| 2005/0227542 A1 * | 10/2005 | Fukushima et al. | 439/621 |
| 2007/0264867 A1 * | 11/2007 | Harmelink et al. | 439/500 |
| 2009/0034165 A1 * | 2/2009 | Tyler et al. | 361/622 |
| 2010/0134975 A1 * | 6/2010 | Shimizu et al. | 361/694 |
| 2010/0163302 A1 * | 7/2010 | Hashikura et al. | 174/520 |

* cited by examiner

*Primary Examiner* — Jared Fureman
*Assistant Examiner* — Alfonso Perez Borroto
(74) *Attorney, Agent, or Firm* — Mark C. Bach; Jeffrey P. Calfa

(57) ABSTRACT

A battery backup system for providing uninterrupted power to components within a vehicle electronic control module (ECM). The backup system comprises a header connector with a recessed region for the battery. A connector plug is plugged into the header connector over the battery to cover the battery and shield the battery. The backup battery is disposed within the recessed region in contact with electrical contacts extending from the housing of the ECM, the electrical contacts providing a connection between the backup battery and an electronic component needing a backup power supply. Additional terminals on the connector plug can be used to provide power to the backup battery. The backup battery can be in a closed circuit with the electronic component, or the backup battery circuit can be switched to form a closed circuit with the electronic component when the electronic component no longer receives power from the primary power source.

18 Claims, 1 Drawing Sheet

BATTERY BACK UP FOR ELECTRONIC MODULES

FIELD OF THE INVENTION

This invention relates to battery systems for electronic devices, in particular to devices utilizing a back up battery.

BACKGROUND

Back up battery systems and often used in electronic devices. One such system is used for electronic control modules (ECM) in vehicles. Electronic control modules play an important role in motor vehicle engine management systems, as indicated by its widespread use in the automotive industry. In most automotive applications, the ECMs are powered by the vehicle electrical system consisting of the battery, alternator, and wiring harness. When the engine is not operating, the main power source is a primary battery with a limited power storage capacity. When the vehicle is not in use for an extended period of time, the main battery may become completely discharged. In addition, extreme temperature, age of the battery, and faulty wiring may also aggravate the problem of a discharging battery.

Electronic control modules process data received from various vehicle sensors, maintain the data in memory, or execute commands in response to operating conditions as sensed by the various sensors.

Many modern ECM's require a power backup in case a primary supply of power is disconnected. Ensuring continuous real time clock (RTC) function is one of the examples when uninterrupted power is necessary to operate the electronics device. Other applications that benefit from having a backup supply of power include applications that require time/date stamped diagnostic codes, error messages, and other retrievable information, such as engine control units (ECU), chassis and transmission controllers, and telematics.

Two primary methods are available for providing a back up energy source to the ECM in the event of an interruption of the primary supply of power. The first remedy is placing a small, secondary rechargeable battery or other energy storage method permanently within the ECM housing to provide a backup power supply. Rechargeable batteries, however, have a finite operating life and require periodic replacement. To be serviced, access to the battery is required, in which case the module seal has to be broken to open the housing.

An alternative method is to provide a backup power supply by using an external battery connected to the harness. However, when the controller is disconnected from the harness during storage or for servicing, the backup battery is also disconnected from the module.

The present inventor has recognized the need for a backup battery supply that is easily accessible, yet sill protected from the environment.

The present inventor has recognized the need for a back up battery that does not require connection to the harness, allowing the harness to be disconnected from the ECM without interrupting the backup battery supply to the ECM.

The present inventor has recognized the need for a simple design for a back up battery system that requires minimal modification to a header connector, and does not require the need for an additional compartment to house the battery.

SUMMARY OF THE INVENTION

The embodiments of the present invention provide a battery backup system applicable to electronic devices using a backup battery and particularly to a control module for a vehicle. Particularly, a battery backup system for low-voltage electrical components in an electronic control module (ECM) includes a backup battery disposed within a recessed region in a header connector for the electronic control module. Connector plugs are plugged into the header connector, with the connector plug disposed over the battery so as to shield the battery The recessed region in the header connector is sized to fit a battery, such that the battery fits beneath the cover of a connector plug without interfering with the connector's ability to connect to the header connector.

The battery is disposed in contact with electric contacts molded into the header to provide a charging current to the battery. The electric contacts also draw power from the backup battery when needed.

Because the battery is connected external to the electronics module housing, the electronics module housing need not be opened to access the battery for replacement. The battery is not connected through the wire harness to the ECM, but rather is separately connected to the ECM, thus allowing the battery to continue to be connected to the ECM to provide power even when the harness needs to be unplugged from the ECM.

DETAILED DESCRIPTION

Figure 1:
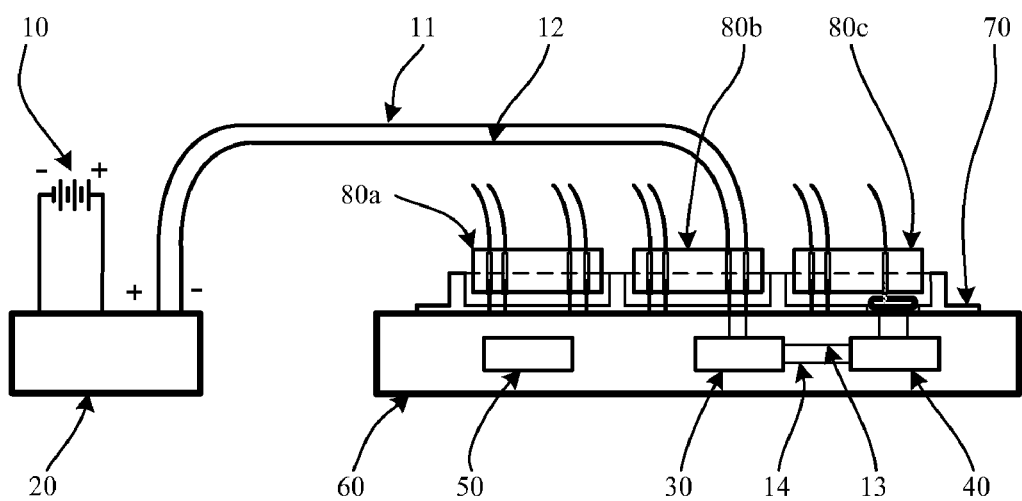
FIG. 1 is a schematic diagram illustrating parts of a vehicle electrical system.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 is a schematic diagram illustrating parts of a vehicle electrical system. An electronic control module 60 (ECM) comprises a microprocessor 50 which can receive, process, and execute various software commands in accordance with the desired operation. A vehicle may have many different ECMs to control the operation of various aspects of a vehicle. Different types of ECMs include control units for engine control, speed control, airbag control, on board diagnostics, body control modules, and control of other aspects to ensure smooth operation and use of a vehicle.

Each ECM has its own internal power supply transformer 30, which is connected to a primary power source for the vehicle, such as the vehicle battery 10. As illustrated, the ECM power supply is connected via a positive voltage wire 11, and a ground wire 12, to a fuse block 20 in connection with the vehicle battery 10. Positive voltage wire 11 and ground wire 12 are connected to the power supply transformer 30 through connector plug 80a. The power supply transformer 30 supplies power to the ECM and sensors connected to the ECM.

A header connecter 70 allows connector plugs 80a, 80b, and 80c to be plugged in communication with the microprocessor 50 to transmit information from the sensors to the microprocessor.

In many ECMs, where real time data is preferably recorded for diagnostic purposes and retrieved at a later time, such as for an engine control module, a real-time clock (RTC) 40 is used to provide a time/date stamp of the events monitored by the ECM. For example, an ECM for engine control may log performance data as a function of actual time, or log each time the engine has started, is idling, restarted, or stopped. Other ECM's may keep track of the time in between servicing the vehicle, such as oil, coolant and filter changes.

To maintain a log of real time information, the RTC needs to be continuously powered, even when the vehicle engine has been stopped. In addition to providing power to the ECM and the sensors connected to the ECM, the power supply transformer 30 in the ECM provides power to the RTC 40 from the vehicle battery.

A back-up battery source is usually provided to ensure that the RTC is continuously powered in the event that the primary power source from the vehicle battery fails. The backup power source is preferably rechargeable or replaceable, or both, and accessible for replacement. Rechargeable batteries have a longer shelf life, but eventually need replacement. Batteries are replaced when their output voltage has substantially diminished to a predetermined level. The voltage of the backup battery 100 is determined by the voltage requirements of the RTC 40, and other functions requiring uninterrupted power.

Figure 2:
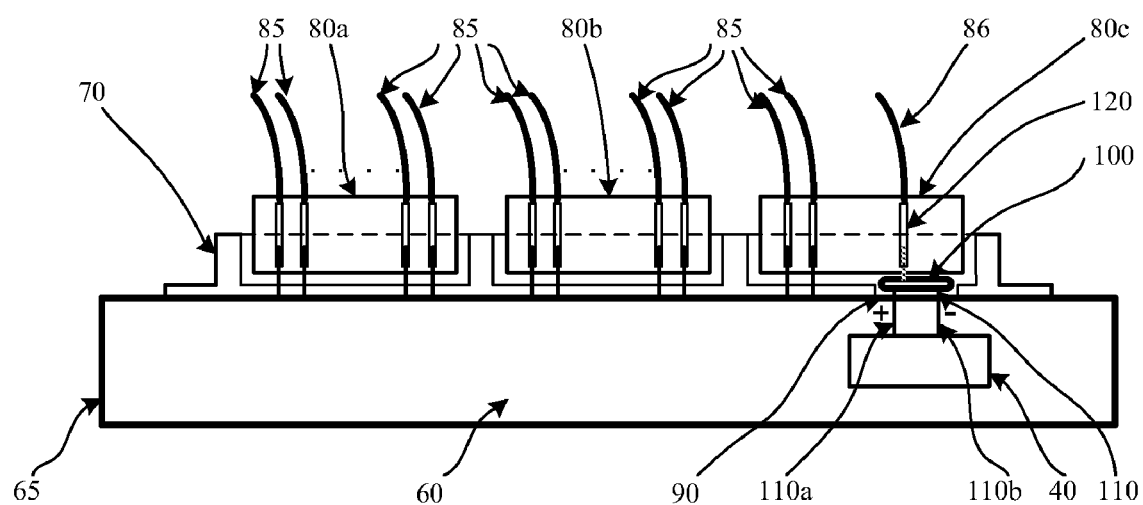
FIG. 2 illustrates an embodiment of the present invention wherein the backup battery is external to the electronics module.

In FIG. 2, a backup battery 100 is installed directly in the header connector 70, allowing access to the battery 100 without having to open the ECM housing 65. The battery is positioned within a battery pocket 90, which is formed by removing portions of the header connector 70 to form a recessed region sized to fit a battery. Electric contacts 110 molded into the header connector are in contact with the battery. Wires 110*a*, 100*b* connect the backup battery 100 to the RTC 40. Connection to the RTC 40 provides a charging current to the backup battery and allows the RTC to draw power from the backup battery 100 when needed.

In another embodiment, a terminal 120 in the header connector may be used to supply a source of power to the battery 100 via a wire 86. The battery 100 may be a rechargeable battery, in which case a wire 86 can provide a source of charge if the battery 100 is not in a closed circuit with the RTC 40 when the primary power source is providing a power supply to the RTC 40. The circuitry connecting the battery to the RTC, as well as any device in need of uninterrupted power may be arranged according to one skilled in the art, to provide the desired levels of power to each component requiring uninterrupted power. The circuitry may comprise a switch which connects the backup battery to the RTC and other devices requiring an uninterrupted supply of power, only when the primary source of power fails.

In another embodiment, the battery may be charged from a source within the ECM. An ECM power supply provides a source of power to the battery.

Connector plugs 80*a*, 80*b*, 80*c* are plugged into the header connector 70 of the ECM 60. Because the battery is disposed in a recessed region, the battery fits underneath one of the connector plug covers. The battery should not interfere with the connector plug's connection to the header connector.

The battery 100 is fitted underneath one of the connector plugs 80*c*, such that the battery is covered or protected from exposure to the vehicle environment. The connector plug provides access to the battery while at the same time doubles as a sealed cover, thus eliminating the need to for an additional compartment to house the battery to protect it, while allowing for easy access to the battery for service. The battery functions as an internal power source. Because the battery 100 is separately connected to the ECM 60, and not connected through the harness 85, the battery 100 continues to be connected to the ECM 60 to provide power even with the harness unplugged from the ECM 60.

In other embodiments, more than one backup battery 100 can be provided for an ECM 60 if desired.

PARTS LIST

10 Vehicle battery
11 Positive voltage wire
12 Ground wire
20 Fuse box
30 Internal power supply transformer
40 Real-time clock
50 Microprocessor
60 Electronic control module
65 Electronic control module housing
70 Header connecter
80*a* Connector plug
80*b* Connector plug
80*c* Connector plug
85 Wiring Harness
86 Wire
90 Battery Pocket
100 Backup Battery
110 Electric contacts
110*a* Wires
110*b* Wires
120 Terminal From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A battery backup system for providing uninterrupted power to components within an electronic module, comprising:
    a connector for connecting a connector plug in communication with the electronic module, the connector comprising a recessed region;
    a backup battery disposed within the recessed region, the connector comprising electrical contacts within the recessed region which are in connection with the backup battery, the electrical contacts being in a circuit with at least one component within an electronic module; and
    a connector plug connected to the connector, the connector plug being disposed over the backup battery to cover the backup battery.

2. The battery backup system of claim 1 wherein the recessed region is sized and shaped to fit the backup battery.

3. The battery backup system of claim 1 wherein the recessed region is of a depth equal to at least the height of the battery.

4. The battery backup system of claim 1 wherein the connector plug further comprises a terminal for providing power to the battery to recharge the battery.

5. The battery backup system of claim 1 wherein the electrical contacts are in a circuit with a power supply within the electronic module for providing power to the battery to recharge the battery.

6. The battery backup system of claim 1 wherein the at least one component within the electronic module is in a continuous circuit with the backup battery.

7. The battery backup system of claim 1 wherein, the circuit further comprises a switch for connecting the circuit to, and disconnecting the circuit from, the component depending on whether a backup power supply is needed.

8. A battery backup system for providing uninterrupted power to components within an electronic control module in a vehicle, comprising:
    a header connector for connecting plural connector plugs in communication with the electronic control module, the header connector comprising a recessed region;
    a backup battery disposed within the recessed region, the connection comprising electrical contacts which are in connection with the backup battery, the electrical contacts being in a circuit with at least one component within an electronic control module; and
    a connector plug connected to the header connector, the connector plug being disposed over the backup battery to cover the backup battery.

9. The battery backup system of claim 8 wherein the recessed region is sized and shaped to fit the backup battery.

10. The battery backup system of claim 8 wherein the recessed region is of a depth equal to at least the height of the battery.

11. The battery backup system of claim 8 wherein the connector plug further comprises a terminal for providing power to the battery to recharge the battery.

12. The battery backup system of claim 8 wherein the electrical contacts are in circuit with a power supply within the electronic module for providing power to the battery to recharge the battery.

13. The battery backup system of claim 8 wherein the at least one component within the electronic control module is in a continuous circuit with the backup battery.

14. The battery backup system of claim 8 wherein, the circuit further comprises a switch for connecting the circuit to, and disconnecting the circuit from, the component depending on whether a backup power supply is needed.

15. A method for providing uninterrupted power for operating an electronic component in a vehicle electronic control module, comprising the steps of:
    providing a backup battery exterior to a housing of the electronic control module, the backup battery being in contact with electrical contacts;
    connecting the connector plug into a connector header over the backup battery such that the backup battery is shielded by the connector plug; and
    providing a connection via the electrical contacts, between the backup battery and the electronic component when a backup supply of power is needed by the electronic component.

16. The method of claim 15 further comprising the step of disconnecting the connection between the backup battery and the electronic component when a backup supply of power is not needed by the electronic component.

17. The method of claim 15, further comprising the step of providing a source of power to the battery through a terminal in the connector plug.

18. The method of claim 15, further comprising the step of providing a source of power to the battery from a power supply within the electronic module.

* * * * *